No. 871,768. PATENTED NOV. 26, 1907.
G. A. AMSDEN.
CABLE CARRIER APPARATUS.
APPLICATION FILED NOV. 27, 1905.

6 SHEETS—SHEET 2.

No. 871,768. PATENTED NOV. 26, 1907.
G. A. AMSDEN.
CABLE CARRIER APPARATUS.
APPLICATION FILED NOV. 27, 1905.

6 SHEETS—SHEET 4.

No. 871,768. PATENTED NOV. 26, 1907.
G. A. AMSDEN.
CABLE CARRIER APPARATUS.
APPLICATION FILED NOV. 27, 1905.

6 SHEETS—SHEET 5.

Witnesses:
A. L. Nusser
L. G. Bartlett

Inventor:
George A. Amsden
By Edwin Gilman
and J. L. Rush
attys.

THE NORRIS PETERS CO., WASHINGTON, D. C.

No. 871,768. PATENTED NOV. 26, 1907.
G. A. AMSDEN.
CABLE CARRIER APPARATUS.
APPLICATION FILED NOV. 27, 1905.
6 SHEETS—SHEET 6.
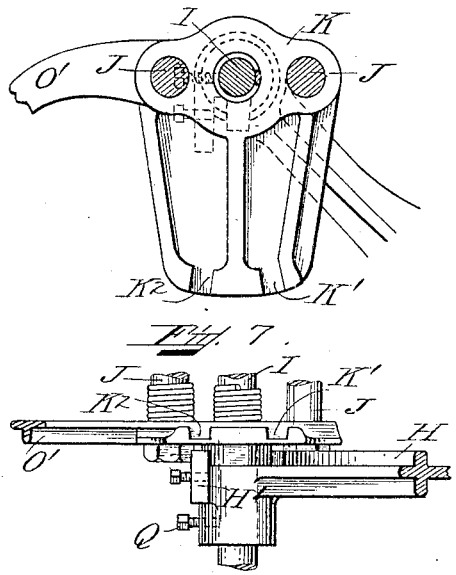
Fig. 7.
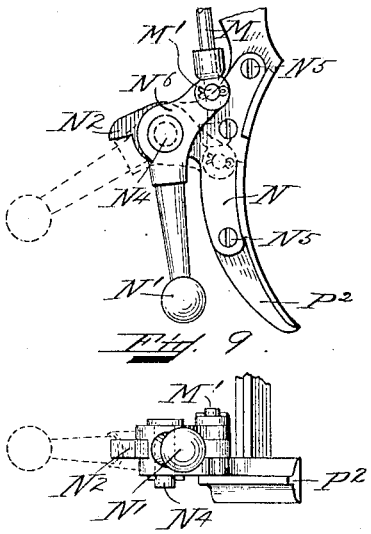
Fig. 9.
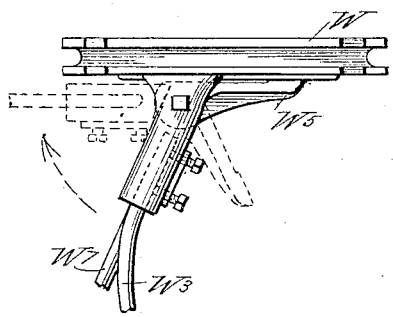
Fig. 8.
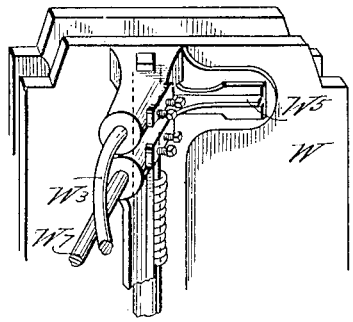
Fig. 10.
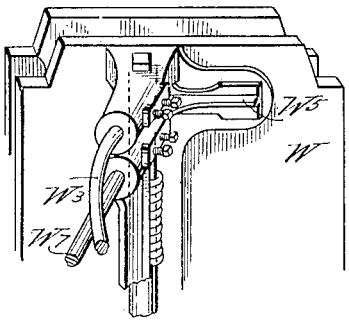
Fig. 11.
Fig. 12.

UNITED STATES PATENT OFFICE.

GEORGE A. AMSDEN, OF LOWELL, MASSACHUSETTS, ASSIGNOR TO LAMSON CONSOLIDATED STORE SERVICE COMPANY, OF NEWARK, NEW JERSEY, A CORPORATION OF NEW JERSEY.

CABLE CARRIER APPARATUS.

No. 871,768.      Specification of Letters Patent.      Patented Nov. 26, 1907.

Application filed November 27, 1905. Serial No. 289,200.

*To all whom it may concern:*

Be it known that I, GEORGE A. AMSDEN, of Lowell, in the county of Middlesex and State of Massachusetts, have invented certain new and useful Improvements in Cable Carrier Apparatus, of which the following is a specification.

My invention relates to improvements in cable carrier apparatus and principally to improved means for supporting and automatically despatching tubes or receptacles to be conveyed along the line of said apparatus. This is accomplished by providing a swinging station or carriage which is automatically swung into the path of a designated carrier, which carrier picks up the tube or receptacle therefrom. Means are also provided whereby a loaded carrier on said apparatus will pass a station supporting a load ready for despatching, without causing said station to swing into coöperation with said carrier.

Another object is to facilitate the discharge of the tubes from said carriers at their destination.

Numerous other important features of my invention are hereinafter described and particularly pointed out in the claims.

Figure 1:
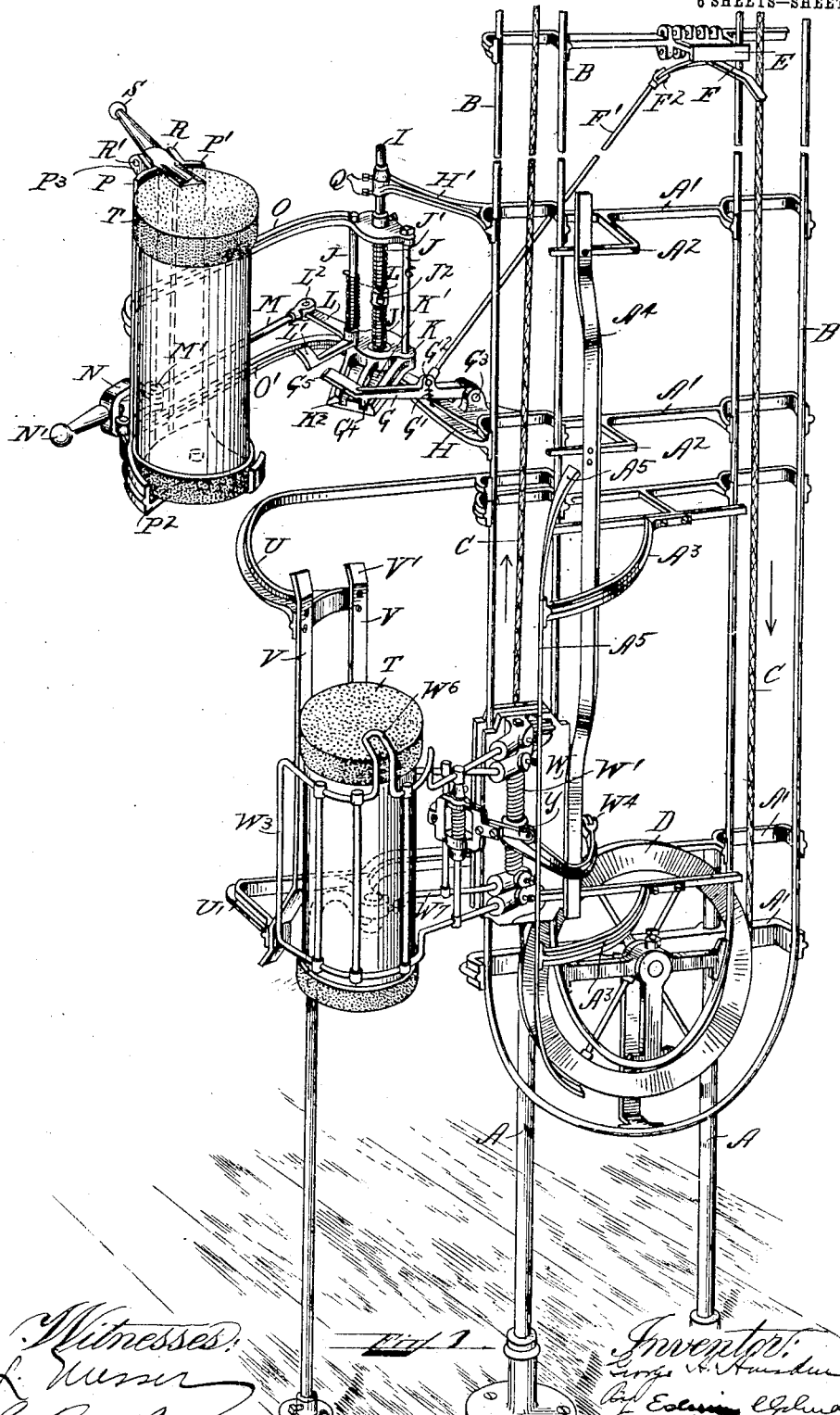
Figure 2:
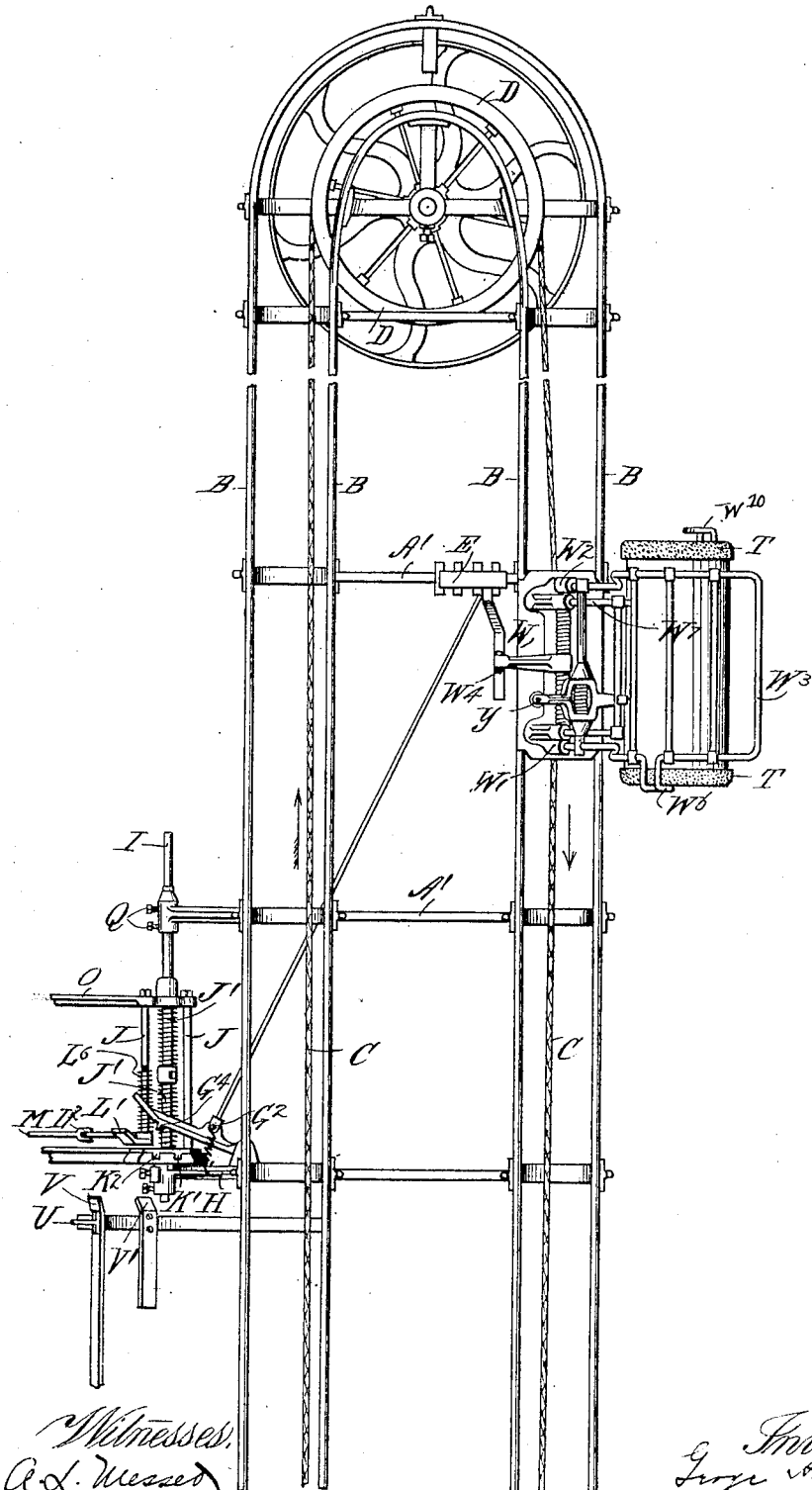
Figure 3:
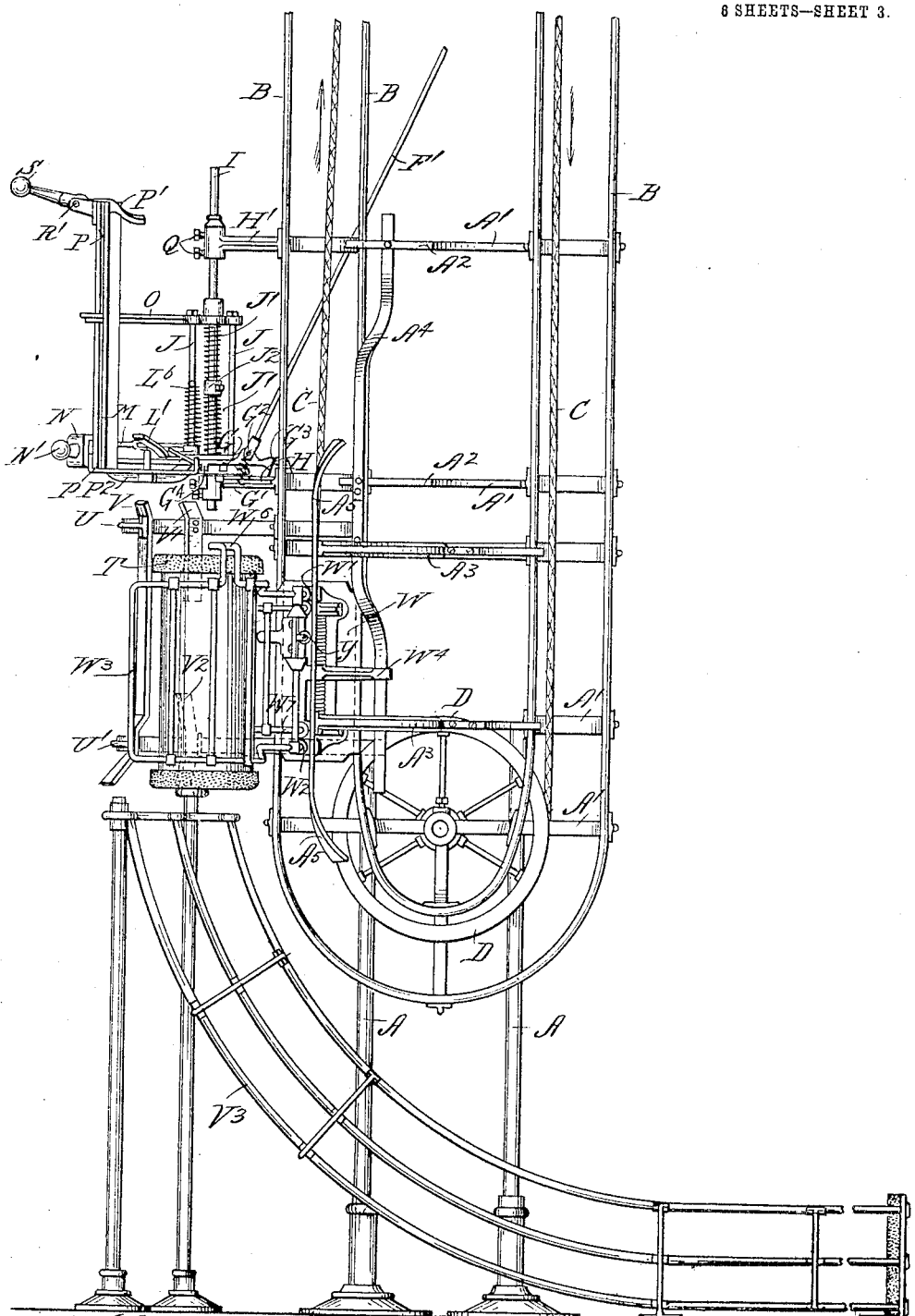
Figure 4:
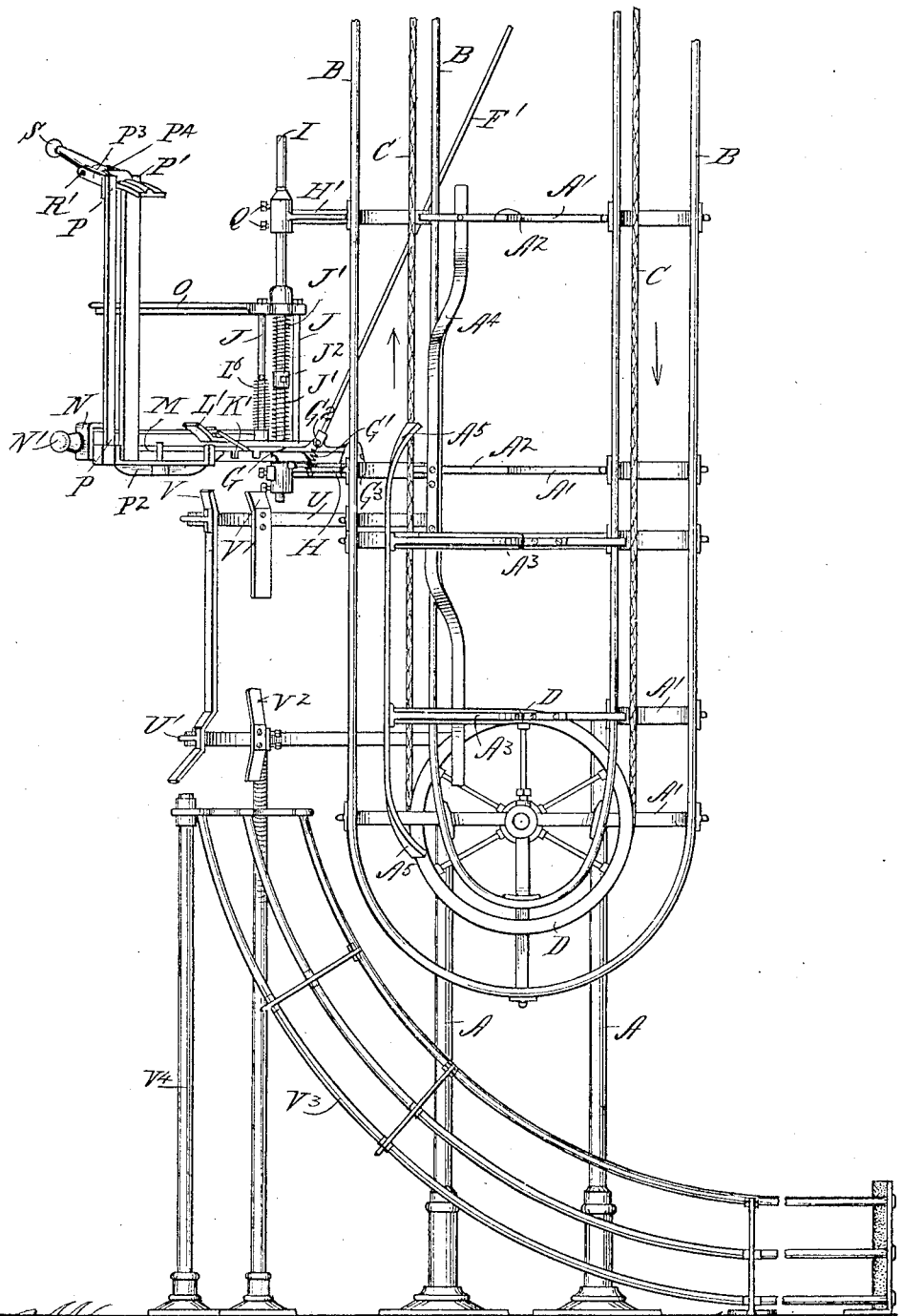
Figure 5:
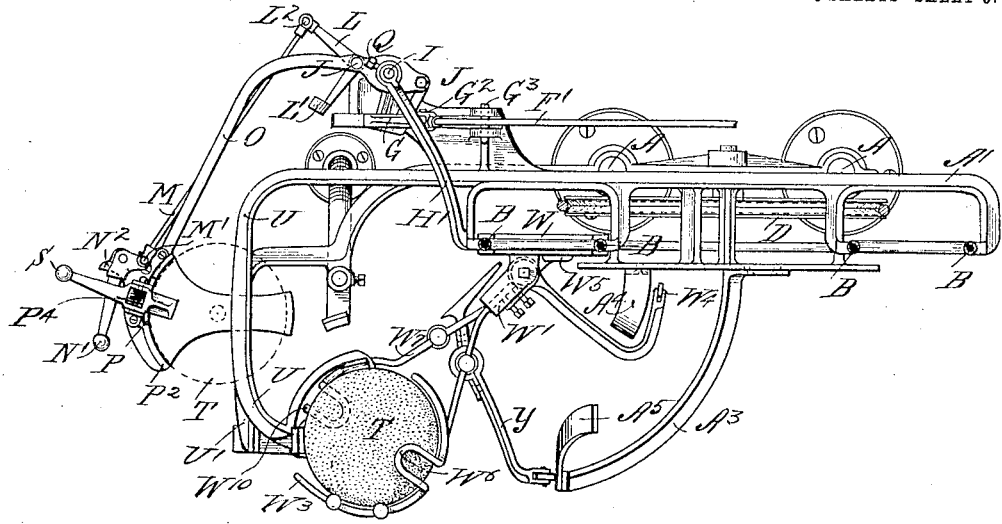
Figure 6:
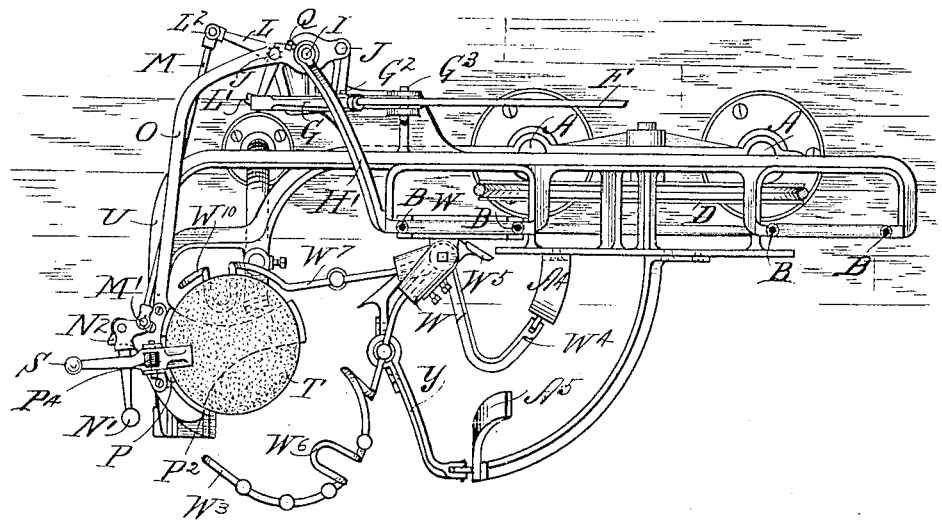

In the accompanying drawings which illustrate a construction embodying my invention, Figure 1 is a perspective view of a vertical drop despatching station in which a number 4 traveling carrier is passing a number 3 automatic despatching station. Fig. 2 is a front elevation showing the carrier operating upon a graduated lever, thereby releasing the carriage and allowing it to swing the tube into position to be picked up by said carrier. Fig. 3 is a front elevation of a vertical drop receiving and despatching station showing the carrier about to discharge the tube into the receiving rack. Fig. 4 is a front elevation showing general arrangement of a vertical drop receiving and despatching station. Fig. 5 is a top plan view of Fig. 1. Fig. 6 is a top plan view showing the carrier with clamp open ready to pick up the tube from the carriage which is swung into its path of travel. Fig. 7 is a plan view of the mechanism for limiting the swing of the carriage. Fig. 8 is a front elevation of Fig. 7. Fig. 9 is a plan view of pivoted handle for resetting the carriage. Fig. 10 is a front elevation of Fig. 9. Fig. 11 is a plan view of a portion of the carrier showing the stop limiting the movement of the pivoted clamp. Fig. 12 is a perspective view of Fig. 11.

Like letters of reference refer to like parts throughout the several views.

The cylindrical rods forming the tracks or guides for the carriers are spaced and supported by the cross brackets $A'$. The standards $A$ fixed to the lower brackets $A'$ support the structure from the floor. The traveling cable $C$ attached to the carrier $W$ is supported by the grooved pulley $D$ and actuates the said carrier $W$ along the tracks or ways $B$.

The carrier $W$ consists of a grooved base, said base adapted to coöperate with and guide said carrier $W$ along the tracks $B$—a stationary clamp or holder $W^3$ rigidly mounted in the grooved base, a movable clamp $W^7$ pivoted to the said base and held normally closed by springs $W'$ and locked in said closed position by the latch $Y$ pivoted to the stationary clamp or holder $W^3$. The arm $W^4$ is fixed to and adapted to operate the movable clamp $W^7$ by means of the cam tracks $A^4$ fixed to extensions $A^2$ on the brackets $A'$. The cam tracks $A^5$ are fixed to extensions $A^3$ on brackets $A'$ and are adapted to engage and open the latch $Y$ previous to discharging or picking up a tube at a station. Cam tracks $A^4$ are graduated to operate and open the clamp $W^7$ of a corresponding carrier at its designated station for discharging or picking up a tube.

The receiving station (Fig. 4) is composed of the guiding member $V$ and the diverting or automatic releasing members $V'$ and $V^2$ fixed to and supported by the extensions $U$ and $U'$. The rack $V^3$ is supported by the standard $V^4$ and is adapted to receive the tube after being discharged from the carrier. The automatic despatching station proper consists of the strips $P$ and $P'$ fixed to and supported by the transverse arms $O$ and $O'$. An extension $P^2$ of the arm $M$ forms a base and support for the tube. The hand operated snap $S$ is pivoted on the rod $R'$, which rod is fixed in the yoke $P^3$ fastened to the top of the strips $P$ and $P'$ by suitable screws. Said snap $S$ is actuated by a spiral spring $P^4$ mounted on the rod $R'$ (Fig. 5). Arms $O$ and $O'$ are spaced and supported by cross bars $J$ and are also pivoted on the rod $I$, which rod is rigidly held and supported from the main frame by arms $H$ $H'$ to which it is fastened by suitable bolts $Q$. The springs $J$ and J' mounted on the rod I are fixed at one end to the collar J² which is bolted to rod I and at the other end fastened to the pivoted arms O and O' and hold the station normally out of the path of travel of the carriers.

The slotted member K is formed by an extension of the pivoted arm O' and carries the slots or recesses K' and K². These slots are adapted to engage the projection G⁴ on latch G, which latch G holds the carriage in both operating and non-operating positions. The latch G is pivoted by pin G³ to projection upon arm H. Spring G' holds said latch in position in recesses K' and K². The rod F' is pivoted by pin G² to latch G, and pivoted also at the opposite end to trip lever F by pin F². Trip lever F is pivoted to the graduated member E.

Mechanism for resetting the station or carriage consists of the plate N fastened to the support P² by screws N⁵ (Fig. 9).

Pivoted at N⁴ to plate N is lever yoke N⁶ carrying handle N'. The rod M is pivoted at M' to said yoke N⁶ and connects the same with cam-lever L to which said rod M is pivoted at L².

The spring L⁶ holds the cam lever L normally out of contact with latch G.

The operation briefly is as follows: a #3 carrier conveying a tube T is moving in the direction indicated by arrows (see Fig. 2) and on passing the graduated member E which carries the trip lever F adapted to operate and release a #3 despatching station, the arm W⁴ engages said lever F and through medium of rod F' throws the projection G⁴ of latch G out of the slot K'. The carriage actuated by springs J' swings into the path of travel of the carrier until the said latch coöperates with the slot K² locking the carriage in operating position.

Carrier #3 now approaches receiving station #3 as shown in Fig. 3. The latch Y engages the cam track A⁵ releasing said latch and the clamp W⁷ is opened by means of the arm W⁴ engaging the graduated cam track A⁴. The lower part of said clamp W⁷ carrying the tube T supported by the projection W¹⁰ passes inside of the strip V² thence outside of the strip V' said strip V' engaging and forcing the tube out of said clamp W⁷ and into the receiving rack V³. The carrier #3 now approaches with open clamp the despatching holder #3 which is swung into coöperating position in the manner heretofore described (Fig. 6) and supports a tube to be conveyed. The lip or projection W¹⁰ on the open clamp W⁷ engages the tube and the tube is lifted out of the holder. The clamp W⁷ now closes upon the clamp W⁶, being released by the cam track A⁴, and firmly grips the tube. The latch Y now locks the clamp W⁷ in position. The holder may now be reset by pulling the handle N', and through rod M operating the cam lever L causing the cam surface L' to engage with the end of latch G⁵ releasing the latch G, and the carrier is swung back until the projection G⁴ engages the slot K'. A carrier graduated for a different station will not operate upon the trip lever F releasing the #2 station, but will pass said station without discharging or picking up a tube as shown in Figs. 1 and 5.

Having thus described the nature of my invention, and set forth a construction embodying the same, what I claim as new and desire to secure by Letters Patent of the United States is:

1. In a cable carrier apparatus, a track or way, an endless propelling cable adapted to be moved continuously along the line of said track or way, a carrier connected with said cable and movable along said track or way and having a clamp adapted to engage the receptacle or article to be conveyed, a pivoted holder for holding the receptacle or article and located out of the path of travel of said traveling clamp, mechanism operated by said carrier for swinging said holder into a position to coöperate with said traveling clamp, and means for opening said clamp as the carrier approaches said holder whereby said receptacle or article is engaged by said clamp and conveyed from said holder.

2. In a cable carrier apparatus, a track or way, an endless propelling cable adapted to be moved continuously along the line of said track or way, a carrier connected with said cable and movable along said track or way and having a clamp adapted to engage the receptacle or article to be conveyed, a pivoted holder for holding the receptacle or article and located out of the path of travel of said traveling clamp, mechanism operated by said carrier for swinging said holder into a position to coöperate with said traveling clamp, means for automatically locking said holder in the path of said traveling clamp, and means for opening said clamp as the carrier approaches said holder whereby said receptacle or article is engaged by said clamp and conveyed from said holder.

3. In a cable carrier apparatus, a track or way, an endless propelling cable adapted to be moved continuously along the line of said track or way, a carrier connected with said cable and movable along said track or way and having a clamp adapted to engage the receptacle or article to be conveyed, a pivoted holder for holding the receptacle or article and located out of the path of travel of said traveling clamp, mechanism operated by said carrier for swinging said holder into a position to coöperate with said traveling clamp, means for automatically locking said holder in said coöperating position, means for opening said clamp as the carrier approaches said holder whereby said receptacle or article is engaged by said clamp and conveyed from said holder, and hand-operated means for releasing and swinging said holder out of the path of traveling clamp, and automatic means for locking said holder in a non-operating position.

4. In a cable carrier apparatus, a track or way, an endless propelling cable adapted to be moved continuously along the line of said track or way, a carrier connected with said cable and movable along said track or way and having a clamp adapted to engage the receptacle or article to be conveyed, a pivoted holder for holding the receptacle or article and located out of the path of travel of said traveling clamp, mechanism arranged in different positions whereby a given carrier automatically releases a given holder to pick up a receptacle but not when passing others, and means for opening said clamp as the carrier approaches said given holder whereby said receptacle or article is engaged by said clamp and conveyed from said holder.

5. In a cable carrier apparatus, a track or way, an endless propelling cable adapted to be moved continuously along the line of said track or way, a carrier connected with said cable and movable along said track or way and having a clamp adapted to engage the receptacle or article to be conveyed, a rack or holder adapted to receive said receptacle or article, means for opening said clamp as the carrier approaches said rack or holder to permit the picking up of said receptacle, and automatic means for releasing said receptacle or article from said clamp, whereby said receptacle or article is received by said rack or holder.

In testimony whereof, I have signed my name to this specification in the presence of two subscribing witnesses, this seventeenth day of November A. D. 1905.

GEORGE A. AMSDEN.

Witnesses:
A. L. MESSER,
L. G. BARTLETT.